United States Patent
Saraswathi et al.

(10) Patent No.: US 12,124,824 B2
(45) Date of Patent: Oct. 22, 2024

(54) TECHNOLOGY AGNOSTIC CANVAS TO GENERATE INTERFACES

(71) Applicant: Salesforce, Inc., San Francisco, CA (US)

(72) Inventors: Pradeep Kumar Saraswathi, Hyderabad (IN); Andrew Peterson, Burlington, MA (US); Sridhar Subramaniam, Buffalo Grove, IL (US); Shelby Hubick, Vancouver (CA); Dylan Merrick, Vancouver (CA); Ronak Shah, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 86 days.

(21) Appl. No.: 18/162,487

(22) Filed: Jan. 31, 2023

(65) Prior Publication Data
US 2024/0256234 A1    Aug. 1, 2024

(51) Int. Cl.
G06F 17/00    (2019.01)
G06F 8/35    (2018.01)
G06F 8/38    (2018.01)
G06F 8/41    (2018.01)

(52) U.S. Cl.
CPC ............. *G06F 8/38* (2013.01); *G06F 8/35* (2013.01); *G06F 8/41* (2013.01)

(58) Field of Classification Search
CPC .............. G06F 8/38; G06F 8/35; G06F 8/41
See application file for complete search history.

(56) References Cited

U.S. PATENT DOCUMENTS

| | | | | |
|---|---|---|---|---|
| 9,524,153 | B1* | 12/2016 | Guan | G06F 8/447 |
| 11,443,239 | B2* | 9/2022 | Squires | G06N 20/00 |
| 11,995,458 | B1* | 5/2024 | Retief | G06F 16/11 |
| 2007/0074105 | A1* | 3/2007 | McVeigh | G06F 16/958 |
| | | | | 707/E17.116 |
| 2014/0281892 | A1* | 9/2014 | Baldwin | G06F 40/143 |
| | | | | 715/234 |

(Continued)

FOREIGN PATENT DOCUMENTS

WO    WO-2005043412 A1 *    5/2005    ........... G06F 40/143

OTHER PUBLICATIONS

Anderson, Paul;, et al, "A Formal Semantics for the SmartFrog Configuration Language", Journal of Network and Systems Management 24.2: 309-345. New York: Springer Nature B.V. (Apr. 2016). (Year: 2016).*

(Continued)

*Primary Examiner* — Laurie A Ries
(74) *Attorney, Agent, or Firm* — Kwan & Olynick LLP

(57) ABSTRACT

In some embodiments, a method receives a definition that associates a compiler with a content type. The definition defines blocks that can be included in the content type. The method receives an input to create the content type on a platform. A compiler is selected from a plurality of compilers based on the compiler being associated with the content type in the definition. Compilers use different technologies to generate content, and the platform allows the plurality of compilers to be used. The method receives a model for creating content for the content type and processes the model using the compiler to create output for blocks in the model. The output for the blocks is rendered to display the content on a user interface.

20 Claims, 13 Drawing Sheets

(56) References Cited

U.S. PATENT DOCUMENTS

| | | | |
|---|---|---|---|
| 2017/0339229 A1* | 11/2017 | Miller | G06F 16/70 |
| 2020/0005523 A1* | 1/2020 | Brebner | H04W 4/021 |
| 2022/0270523 A1* | 8/2022 | Negri | G06F 11/3672 |
| 2023/0095089 A1* | 3/2023 | Kaliyaperumal | G06V 30/413 |
| | | | 715/762 |

OTHER PUBLICATIONS

Muehlbach, Sascha, et al, "Malacoda: Towards high-level compilation of network security applications on reconfigurable hardware", ANCS 2012—Proceedings of the 8th ACM/IEEE Symposium on Architectures for Networking & Communications Systems: 247-257. Association for Computing Machinery. Dec. 25, 2012 (Year: 2012).*

Shipnes, Julie, et al, "A modular approach to Motorola PowerPC compilers", Communications of the ACM 37.6: 56(8). Association for Computing Machinery, Inc. (Jun. 1994). (Year: 1994).*

* cited by examiner

```
{
  "$schema": "https://cms.salesforce.com/types/sfdc_cms__contentType",
  "type": "object",
  "title": "Blog Post",
  "description": "Schema for a blog post template",
  "properties": {
    "featuredImage": {
      "title": "Featured Image",
      "description": "Add a visual element to the blog post",
      "type": "image"
    },
    "excerpt": {
      "title": "Excerpt",
      "description": "An excerpt is a snippet of your blog post.
        It's used as a teaser to draw readers to the content.",
      "type": "multi-line-text"
    }
  },
  "required": [
    "featuredImage"
  ],
  "design": {
    "canvas": {
      "compiler": "custom_namespace/handlebarsCompiler"
    }
  }
}
```

- 402 (featuredImage block)
- 404 (excerpt block)
- 406 (required)
- 408 (canvas)

Figure 4

```
c/handlebarsCompiler ———502

// declare dependencies
Imports handlebars  ———504

Class HandlebarsCompiler {
        @api blockTree render() {
                return handlebars      ⟋—506
                        .compile(this.blockTree)
        } onPatch(patch) {    ⟋—508
                // handle document patch
                ...
        }
}
```

Figure 5

TECHNOLOGY AGNOSTIC CANVAS TO GENERATE INTERFACES

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to a system for storing and operating tools and more specifically to providing a platform for using content creation tools.

BACKGROUND

A What You See Is What You Get (WYSIWYG) builder provides a graphical user interface that allows users to create content. The created content may appear in the interface as the user builds the content. There may be multiple different builders that can be used to generate content, such as website builders, email builders, content builders, etc. The builders are typically tied to a specific front-end technology or component library. The users of each builder need to adapt to the technology supported by the builder to create content and leverage the builder's preview and design mode functionalities, such as drag and drop, clone, delete, etc.

BRIEF DESCRIPTION OF THE DRAWINGS

The included drawings are for illustrative purposes and serve only to provide examples of possible structures and operations for the disclosed inventive systems, apparatus, methods and computer program products for content creation tools. These drawings in no way limit any changes in form and detail that may be made by one skilled in the art without departing from the spirit and scope of the disclosed implementations.

FIG. 4 depicts an example of a definition for a content type of a blog post according to some embodiments.

FIG. 5 depicts an example of a compiler component according to some embodiments.

DETAILED DESCRIPTION

Different use cases require the use of different technologies to build content. In some examples, a user of a company may want to build an email template that can be used by the company to generate emails. The user wants to use a first type of technology to build the email, such as Handlebars. Also, a user may want to build a template of a website using the same platform. However, the user may want to use another technology, such as lightning web component (LWC). The user may use the same platform to build the website template, but builds the website using a different technology than that was used to build the email template. The platform allows the different types of content to be built using the different technologies.

The system may be configured with content type definitions that may define which technologies should be used for different content types. For example, when building an email template, the definition may specify that a first technology, such as Handlebars, be used. When building another content type, such as a website, the definition may define using a second technology, such as lightning web component. The platform may use compilers for the respective technologies and register any component libraries that are needed for the compiler to function. The compiler for the content type can use any component libraries that are needed at runtime to generate content.

Accordingly, the platform allows users to use different technologies to build content without needing to use a specific builder for each type of content, such as an email or a web site. This improves the content building process by automatically selecting a technology for a content type. Rather, the platform may be used to generate content using different technologies.

System

Figure 1:
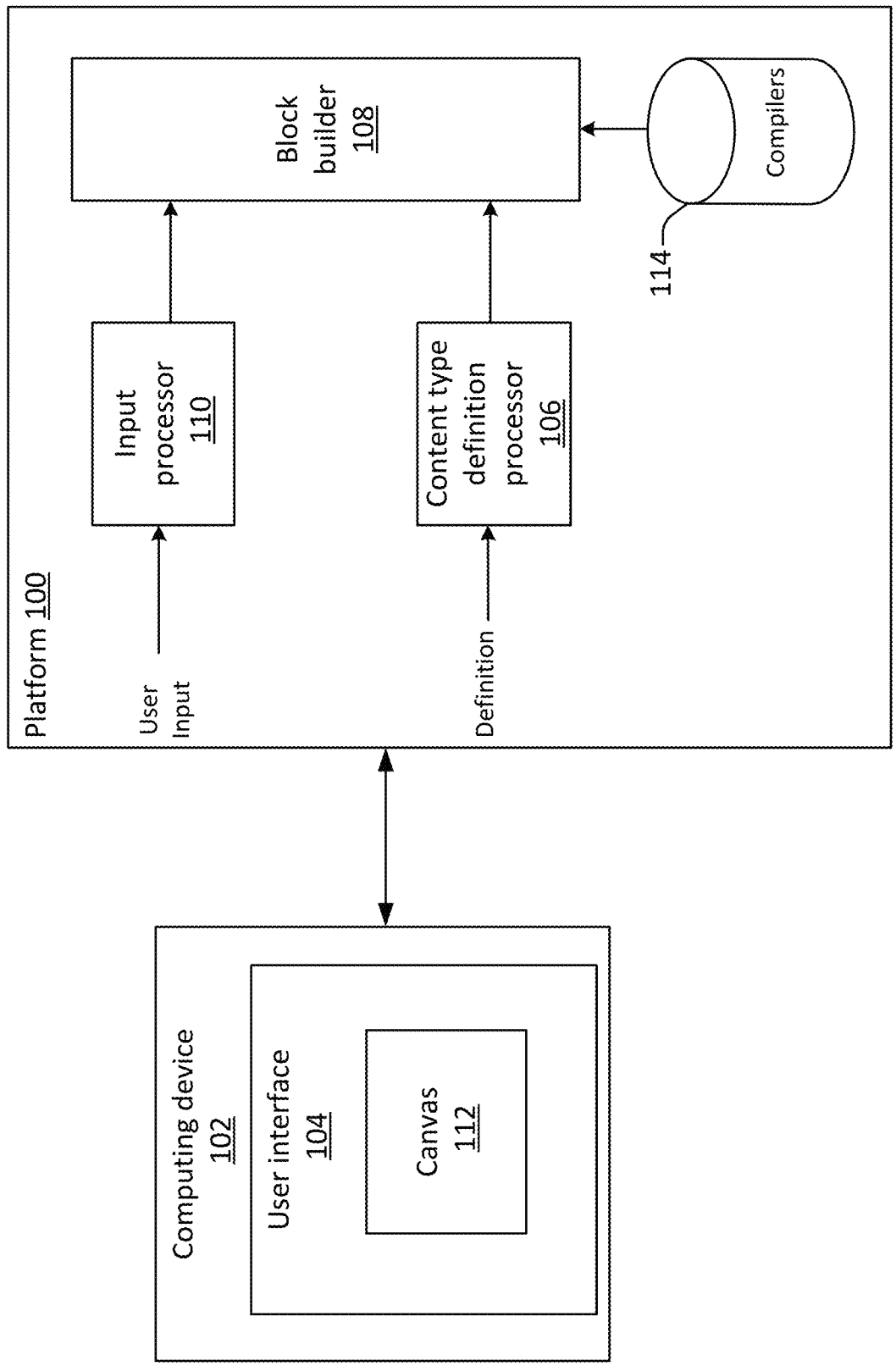
FIG. 1 depicts an example of a platform for providing content builders according to some embodiments.

FIG. 1 depicts an example of a platform 100 for providing content builders according to some embodiments. Platform 100 may be used to build content for a content management system that manages content for an organization. Organizations may use a content management system to store and organize their digital assets. These assets are generally digital content such as images, text snippets, color palettes, email templates, blog post templates, etc. A purpose of storing and organizing the digital assets is to allow easy reuse throughout various media, and to centralize and streamline operations. One example of content may be a company logo. The logo may be stored in various sizes and color schemes, so that users can easily place the logo onto content, such as an internal corporate website, an external customer-facing website, in email marketing campaigns, on print media (brochures or business cards), etc.

Another example of content is a template, such as for an email. The organization might want to reuse the exact same structure in certain content, such as a header, a body and a footer, throughout different email marketing campaigns, but just vary the content based on the occasion. A template allows the organization to maintain a consistency for its brand, and to instill a sense of familiarity with its customers, while reducing the effort required to launch marketing or information campaigns through reuse.

The templates may also be used for other purposes. For example, the organization may have a generic template for parts and pieces of an email template, a blog post template, or any other digital output format. Also, platform 100 may allow portions, or fragments, of a template that can be reused across different media formats. The template may be block based, and include a block of content with a heading, a block for a paragraph, and a block for an image that may appear in an email marketing campaign, on a website and on a blog post. Platform 100 may store those fragments, or components, as digital assets, much like images or music or video files.

Platform 100 may provide multiple different technologies for building different content types. For example, platform 100 may provide WYSIWYG builders, such as website builders, email builders, and content builders, but other types of content builders may be appreciated. A WYSIWYG builder may be a system in which editing software allows content to be edited in a form that resembles its appearance when printed or displayed as a finished product. Typically, users would have to learn how to use and separately use tools for different types of content. For example, a user may have to learn to use the front end tool for Handlebars and the front end tool for Lightning Web Component. This may be inconvenient for many reasons, such as because the user may have to maintain content in different formats and the users may have to store the content in separate places and making a change requires updating all the different formats. However, users of an organization may already be using the content management system and are familiar with its front end interface. Platform 100 allows users to use different technologies to create content. Accordingly, the users of platform 100 do not need to adapt to the different front end technologies offered by the builders. Not only can content be displayed as users design content, platform 100 may enable interactions, such as preview and design functionalities including selection, drag and drop, clone, and delete. In addition to providing typical drag and drop handling (onDrag, onDrop, onSelect, etc.), the interactions library provides full customizability of user interactions, support for dynamic object structures, and prevents interactions with internal elements of blocks. Platform 100 allows users to use their preferred technology to build content, but through a single front end platform.

Platform 100 may be used in different stages. Input may be received from users during those stages. In some embodiments, the stages may be a content type development stage, a template building stage, and a content building stage. The type of user that may provide input during these stages may be described as a content type developer, a template builder user, and a content builder user. The actual user providing the input may be different users and/or the same user.

A content type developer may define content types in platform 100. For example, a content type may be a class of content that can be created by a user, and is defined by its properties, such as the fields of a blog post (e.g., title, subtitle, text content, images, etc.). In some examples, a content type may be email, and another content type may be website content types. In some examples, there can be different email, website, etc. content types, where different content types with different properties are specified. The content type developer may write code/configuration files to define the content types. The code may be in a software language. The content type developer could be the creator of a new type of content, such as a blog post content type, so that a template builder user could then create new blog posts using the content type. The content type developer may define which types of blocks can be used by the content type, such as text blocks, image blocks, etc.

The template builder user may build a content template for a specific piece of content. For example, the template builder user may use functionality offered by platform 100, such as point-and-click functionality, in a template builder application 108 to build a piece of content without writing computer code. For example, the template builder user may use drag-and-drop actions to compose an email template on a user interface 104 of a computing device 102 using blocks defined by the content type developer, but does not design and code the original blocks. For example, the template builder may define blocks in an email template such as a text block and image block. Further, the template builder user does not fill out the content for the blocks.

A content builder user may generate content using the content template. For example, the content builder user may insert content, such as images, videos, text, etc. into the template to form a piece of content. The content may be stored in the content management system. For example, the content builder user may fill out an email template with images and text to create a specific email, but did not create the email template.

Platform 100 provides the infrastructure to allow different technologies to be used to build different content types. For example, platform 100 provides a block builder application 108 that can support multiple types of canvases 112 from different technologies that can be used to build content. Canvas 112 may be the environment in which content may be viewed and arranged. For example, canvas 112 may be an interaction enabled surface, such as a drag and drop surface for the content being built. Canvas 112 is the primary point of interaction for a template builder user or content builder user. For the template builder user, the canvas serves as a pseudo-preview of what the published content of the content template will look like. For the content builder user, the canvas also serves as a pseudo-preview of what the published content should look like with any content inserted into the content template.

Block builder application 108 may build the content using blocks. A block may be a headless modular element that can be constructed declaratively. The block can be flexibly coupled to different types of technologies and renderers for presentation. So, the one part of a block is the structure (or the schema) that makes it truly headless in that the block does not have to depend on another block or technology.

Block builder application 108 can be configured to communicate with canvas 112 of different technologies. After configuration, platform 100 allows template builder users to build content templates using the configured technologies while using a single platform. That is, the template builder user may use platform 100 to generate different content templates for different content types using different technologies as will be described in more detail below. Then, content builder users may use user interface 104 to generate pieces of content using the content templates using platform 100.

As discussed above, platform 100 provides the infrastructure to allow the different technologies to be used. Platform 100 includes a content type definition processor 106 that may receive a definition that defines which technologies should be used for which content types. The definition may define different compilers for the different technologies. The different compilers that are defined may be stored in storage 114. The definition may also define any external dependencies that are required by a compiler. For example, some compilers may require modules, such as third-party libraries, to execute and generate the content. In some examples, a Handlebars compiler may have a dependency on Handlebars framework code that the compiler uses to generate front-end output that is used to display the content. The definition may also adhere to a programming contract, which may mean the definition includes a format or syntax that is required to communicate with canvas 112 and/or a respective compiler. The configuration will be described in more detail starting in FIG. 2.

After defining the compilers that should be used for the content types, input from template builder users to generate content, such as content templates, may be received using user interface 104 on canvas 112. For example, a user input processor 110 may receive user input from a template builder user to build a type of content. In some examples, input may be received from a template builder user indicating the template builder user wants to create a piece of content of a particular type, such as email template. Block builder application 108 may determine which compiler is associated with the content type. For example, block builder application 108 may use the definition of the content type to determine which compiler is associated with the content type. Then, block builder application 108 retrieves the compiler from storage 114 and associates the compiler with a canvas 112 to generate content for the content type. Additionally, block builder application 108 may enable an interactions contract that allows interactions with canvas 112 to be performed. For example, interactions zones, such as drag and drop zones, may be enabled on canvas 112. The generation of the content templates will be described in more detail below starting with FIG. 6.

After defining content templates, content builder users may use user interface 104 to generate pieces of content using block builder application 108. For example, canvas 112 may display the blocks of the content template in addition to allowing the interactions from the user, such as drag and drop of elements. When actions from the content builder user are received, such as the insertion of blocks such as an image or text, block builder application 108 may display the image or text on canvas 112. The generation of the pieces of content will be described in more detail below starting with FIG. 9.

Accordingly, different technologies may be used by platform 100 when creating different pieces of content. The same platform may be used while allowing different technologies to generate output to display the content on canvas 112. The use of block builder application 108 may eliminate the need for users to reproduce content for different output formats, while continuing to leverage the technology's preview and design functionalities, like selection of blocks, drag-and-drop, clone, and delete. For example, block builder application 108 may enable interactions with canvas 112.

The following will now describe the development, content template generation, and content creation according to some embodiments.

Content Template Development

Figure 2:
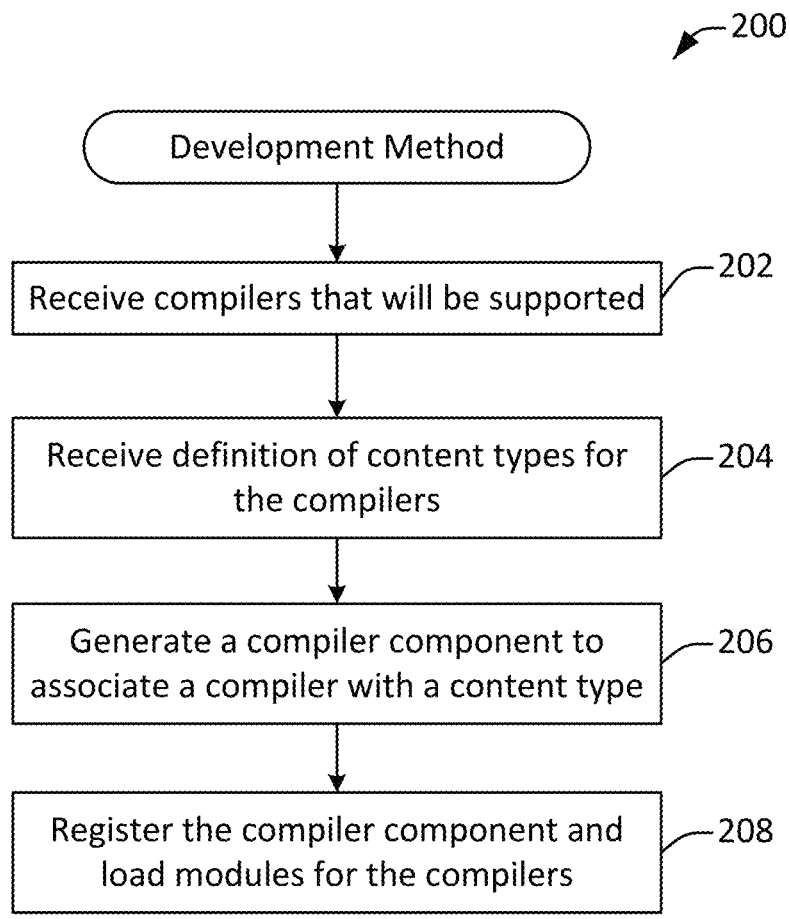
FIG. 2 depicts a simplified flowchart of a method of configuring the platform according to some embodiments.

FIG. 2 depicts a simplified flowchart 200 of a method of configuring platform 100 according to some embodiments. At 202, platform 100 receives compilers that will be supported. For example, different technologies may have specific compilers, such as Handlebars may have a Handlebars compiler and Lightning Web Component may have a Lightning Web Component compiler, etc. The compilers may be stored in storage 114.

Figure 3:
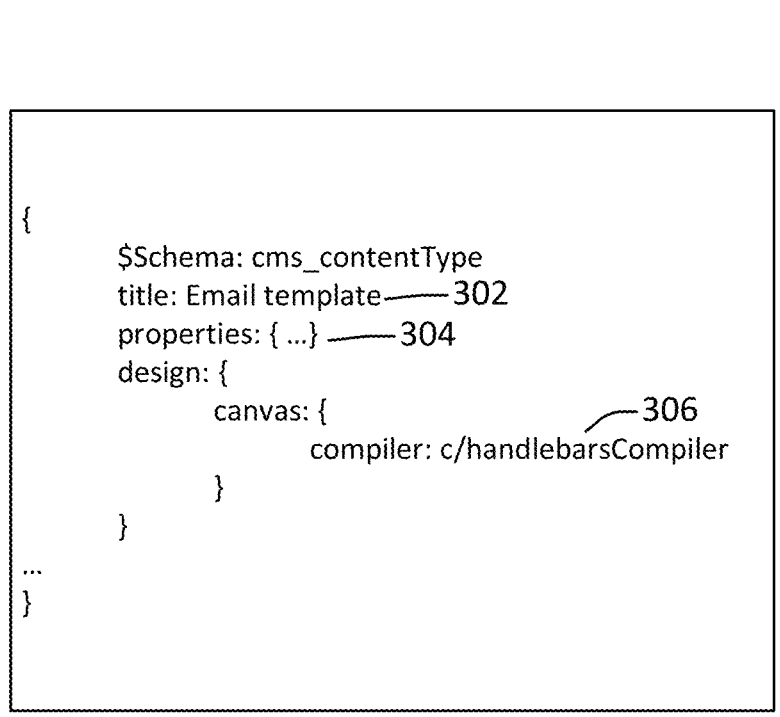
FIG. 3 depicts an example of a definition of a content type that is received from a content type developer user according to some embodiments.

At 204, platform 100 receives a definition of a content type. The definition may specify which compiler should be used for a content type. As discussed above, an email content type for generating email content may be associated with a Handlebars compiler and a content type for generating websites may be associated with Lightning Web Component compiler. FIG. 3 depicts an example of a definition 300 of a content type that is received from a content type developer user according to some embodiments. At 302, the content type of an Email template is specified. At 304, properties of the content type are defined, but not shown. Properties may include definitions of blocks that may be included in the content type, such as sections, columns, headings, paragraphs, etc. The properties may identify the blocks and also include attributes for the blocks. For example, a column may be defined with a width, a paragraph may be defined with text, etc. At 306, the compiler to use for this content type is defined.

To show a definition in more detail, FIG. 4 depicts an example of a definition 400 for a content type of a blog post according to some embodiments. The blog post content may include two properties, a featured image at 402 and an excerpt of text to 404. The featured image may be a place to add an image in the template and includes attributes of title, description and type. The featured image is marked as "required" at 406, which means that a piece of content of this type cannot be saved until the content builder user, who will actually build a blog post based on this content type, supplies an image for that property. The excerpt of text may be a place to insert text in the template and includes attributes of title, description, and type. At 408, definition 400 defines the compiler for the blog post template of a Handlebars compiler.

Referring back to FIG. 2, at 206, platform 100 generates a compiler component to associate a compiler with a content type. Platform 100 may generate and register a compiler component for the content type that can be used to determine the compiler to use when the content template for the content type is later created by a template builder user. FIG. 5 depicts an example of a compiler component 500 according to some embodiments. At 502, component 500 defines the Handlebars compiler for the content type. At 504, component 500 defines a link to import the Handlebars compiler from storage 114. At 506, component 500 defines how to process a block tree for the content type. At 508, component 500 defines how to process a patch to the block tree. The dynamic association of a compiler with a content type allows the generation and presentation of content from the generic metadata format stored in platform 100 in a particular output format technology. These processes will be described in more detail below.

Referring back to FIG. 2, at 208, platform 100 registers component 500 with the content type and loads modules for the compilers. For example, each compiler may be associated with modules that are required by the compiler. Platform 100 may use external dependencies in the definition for the compilers to load the modules that are required. After performing the above steps, platform 100 may be configured to allow content templates to be created.

Block Builder

Figure 6:
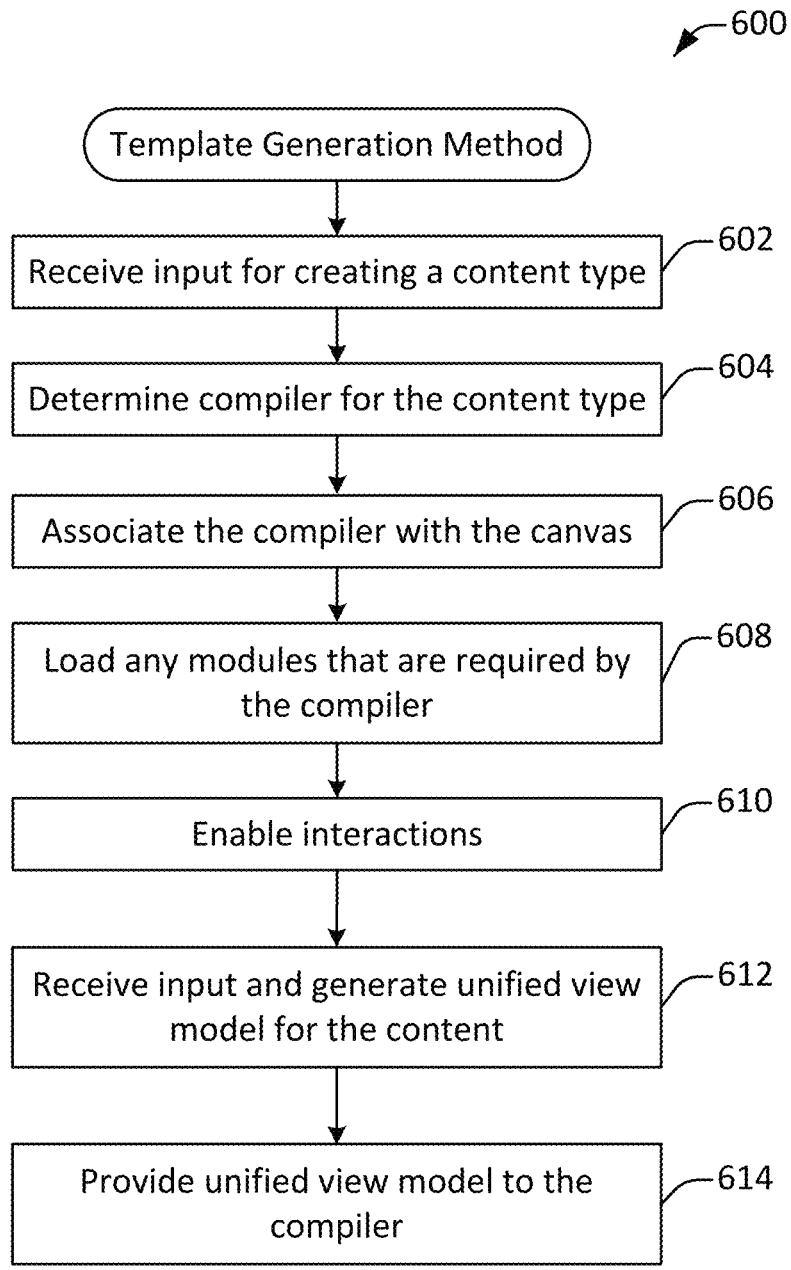
FIG. 6 depicts a simplified flowchart for generating content on a canvas according to some embodiments.

After receiving the definition and configuring the different compilers that can be used for different content types, input from a template builder user may be received to generate content using platform 100. FIG. 6 depicts a simplified flowchart 600 for generating content on canvas 112 according to some embodiments. The following may be performed by a template builder user when the template builder user wants to create a template of a type of content.

At 602, platform 100 receives input for creating a content type. For example, the input may specify an email template or a website template is to be created. Platform 100 may launch block builder application 108 on user interface 104 to allow the template builder to build the content. As discussed above, block builder application 108 may allow the template builder user to interact with the canvas, such as with point-and-click and drag-and-drop actions, to generate blocks of the content template, such as paragraphs, headings, HTML blocks, images, etc. The blocks may be defined by the definition for the content type that was received.

To enable the content generation process. at 604, block builder application 108 determines a compiler for the content type. For example, block builder application 108 may look up the compiler that has been associated with the content type in the compiler component definition as described in FIG. 5.

At 606, block builder application 108 associates the compiler with a canvas 112. For example, the associated compiler may be loaded from storage 114 using a link from the compiler component 500. The compiler will be used to build the content on the associated canvas 112 in user interface 104. Also, at 608, block builder application 108 may load any modules that are required by the compiler, such as any modules that were loaded using external dependencies. For instance, Handlebars is a framework that may be used in building websites and emails, which supports a special syntax for supplying expressions that can be resolved using data at runtime. A compiler supporting the Handlebars framework may specify that the core Handlebars framework assets (e.g., Javascript files) may be needed in the Handlebars compiler, and platform 100 ensures these assets are pre-loaded and available for use by block builder application 108.

At 610, compiler may enable interactions with canvas 112. For example, if the canvas has been configured and programmed to participate in the interactions contract, interactions, such as drag-and-drop functionality, will be automatically enabled. A template builder user may interact with canvas 112 to build the content template. At 612, input may be received from a template builder user to generate the content template and block builder application 108 generates a model for the content. The model may be the specification for a standard way to represent the metadata of content being created, such as the screens, pages, and emails. A view can represent a webpage, an email, a blog post, a landing page, etc. For example, a user may indicate blocks to include in canvas 112, such as input for including different blocks in the template is received. Block builder application 108 may generate a model that defines the blocks. The model may include at least one block tree that defines which blocks to include in canvas 112. The block tree may be a representation, such as a tree representation containing blocks, with root block and child blocks in a hierarchical representation. Other representations may also be appreciated. Examples of blocks may include text boxes, places to insert media, etc.

At 614, block builder application 108 provides the model to the specific compiler for the content type. For example, block builder application 108 injects the compiler into canvas 112 and passes the data for the model to the compiler. The compiler uses the model and generates output for the blocks according to the compiler's associated technology. This generates a display of blocks on canvas 112 that represents the content template as it would appear when published. For example, if an email template is being created, the email template is created in canvas 112 as it would be generated by the compiler for the specific technology. Block builder application 108 may also process changes to the blocks on canvas 112 and generate patches that represent the changes to the model. The patches are passed to the compiler, which can then alter the blocks being created on canvas 112 according to the patch. Further, as interactions are received on canvas 112, the compiler may process the interactions and display content on canvas 112 according to the interactions. For example, if an image block is dragged and dropped on a portion of canvas 112, the compiler may display the image block in the portion of canvas 112.

Figure 7:
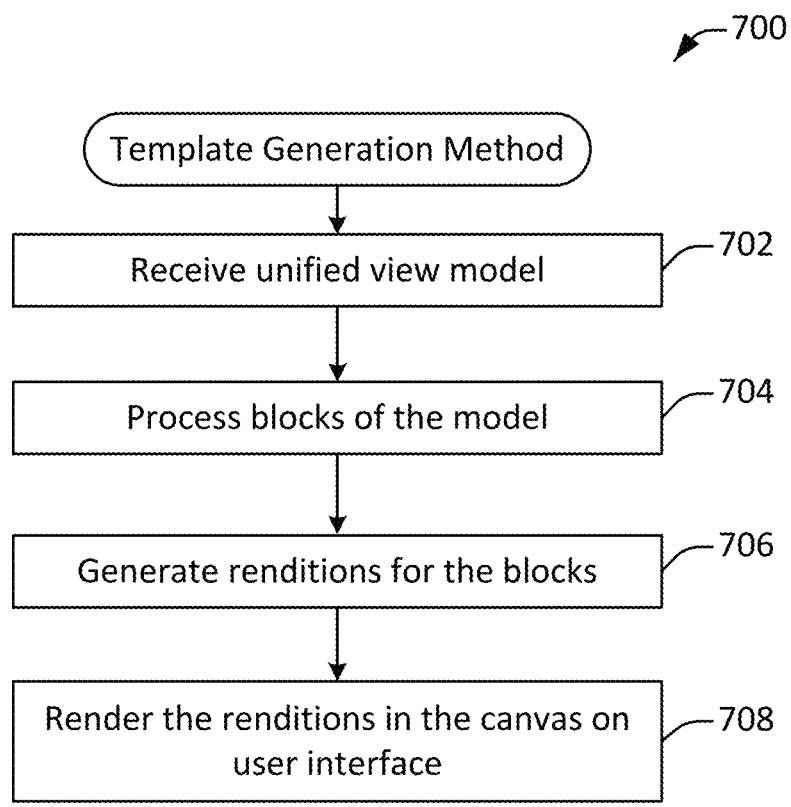
FIG. 7 depicts a simplified flowchart of a method for displaying content on the canvas according to some embodiments.

The following will describe actions of the compiler to generate content on canvas 112 using the model. FIG. 7 depicts a simplified flowchart 700 of a method for displaying content on canvas 112 according to some embodiments. At 702, the compiler receives the model. At 704, the compiler processes blocks of the model. For example, the model may be a block tree, which may be a tree of headless blocks where each block has a number of outputs.

At 706, the compiler generates outputs for the blocks. An output may be information that may be used to display content for the block. In some embodiments, the output may be HTML code, or other code that may be used to display the content. The outputs may be used by user interface 104 to display the content for the blocks. The compiler may generate the outputs using its respective technology. In order to be displayed, each block may be provided an output defined for a given render mode. For Lightning Web Component, a reference to a Lightning Web Component may be used, such as using a special prefix followed by a name of the component, such as @lwc/my_namespace/my_component. For Handlebars, a block can define a Handlebars template equivalent consuming the properties defined in the schema for Handlebars, such as using the following statement <h1>{{title}}</h1><div class="page-content">{{@partial-block}}</div>. The Handlebars compiler would need to load the Handlebars template as part of the initial canvas load.

At 708, the compiler renders the outputs in canvas 112 on user interface 104. User interface 104 may display the content in canvas 112. Blocks that can receive interactions can be marked with an interaction definition and with indicators for receiving interactions. For example, selectable blocks may be marked with a pre-defined "component" technology class (e.g., Cascading Style Sheets (CSS) or HTML) and decorated visually with a border around the block, and areas of canvas 112 that are to be considered containers or "drop zones" for other blocks, may be marked with a pre-defined "region" class and decorated with visual indicators during drag-and-drop operations.

In some examples, different technologies may compile outputs differently. For example, a first technology, such as Lightning Web Component, generates HTML to display on the canvas, recursively, from the block tree, using the Lightning Web Component framework. The compiler fetches block definitions dynamically and builds out a template on computing device 102. A second technology, such as Handlebars, builds out an entire canvas using a programming language, such as HyperText Transfer Markup Language (HTML). The Handlebars compiler may pull in Handlebars components as external dependencies, and converts the block tree into valid Handlebars templates that, when compiled, will show a pure HTML canvas with specified decorations. A third technology, such as Markdown, may be similar to Handlebars and converts a block tree into valid Markdown, which is a markup language. For example, Markdown is a markup language that formats elements in canvas 112. A Markdown compiler pulls in a Markdown user interface preview library to show the block tree as markdown.

Patch Processing

Figure 8:
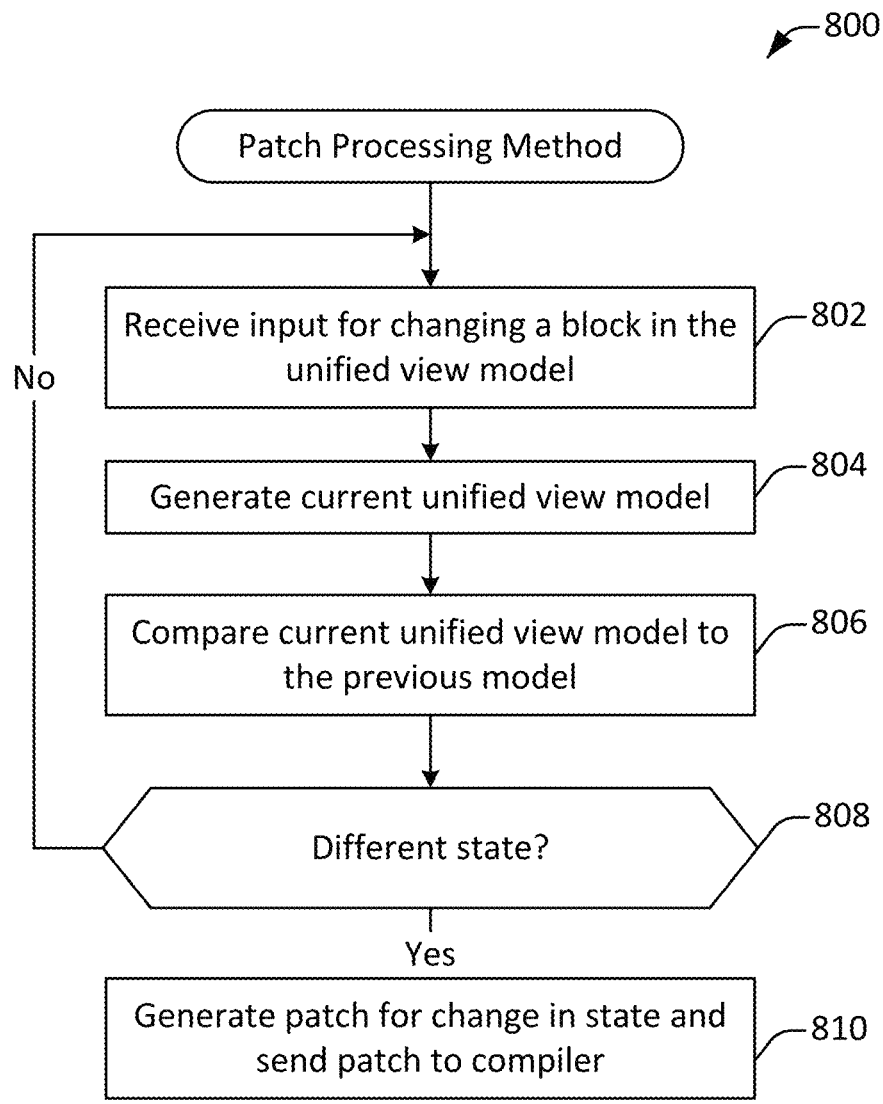
FIG. 8 depicts a simplified flowchart of a method for applying patches to the canvas according to some embodiments.

Changes may be made to blocks in the block tree by a template builder user, which may result in patches that are processed for the changes. FIG. 8 depicts a simplified flowchart 800 of a method for applying patches to canvas 112 according to some embodiments. At 802, platform 100 receives input for changing a block in the model. For example, input may change a text box in an email template to another type of block, or add another block to the hierarchy of the block tree.

At 804, platform 100 generates a current model. For example, previously, input may have been received to generate a previous model that was used to generate outputs for canvas 112. The current model represents the change of a block tree. At 806, platform 100 compares the current model to the previous model. For example, the blocks in the current model and the previous model may be compared to determine any differences. The differences may be summarized in a patch.

At 808, platform 100 determines if a different state exists between the current model and the previous model. If there is not a different state, such as a change has not been received does not result in a change in the block tree, then the process reiterates to 802 to continue to receive input. If a different state is detected, at 810, platform 100 generates a patch and sends the patch to the compiler. The compiler may then use the patch to change the content displayed on canvas 112.

After building the content template, content builder users can generate content using the content templates.

Content Builder Processing

Figure 9:
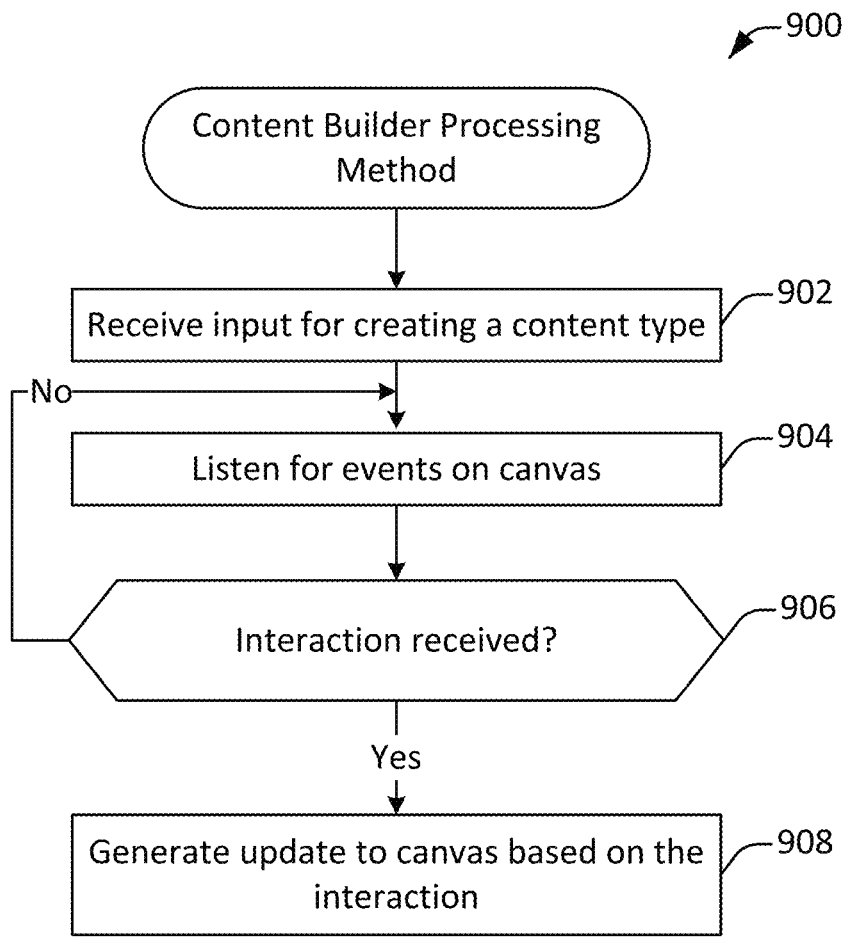
FIG. 9 depicts an interaction processing method according to some embodiments.

FIG. 9 depicts an interaction processing method according to some embodiments. At 902, platform 100 receives an input for creating a content type. For example, the input may specify an email type or a website type is to be created. In some examples, a selection from a menu to add content to the content management system may be received indicating which content type to create. Platform 100 may launch block builder application 108 on user interface 104 to allow the template builder to build the content. As discussed above, block builder application 108 implements an interaction contract that allows an interaction layer to process interactions on canvas 112. The content builder may provide input for creating the content, such as providing images using interactions, such as drag and drop.

At 904, block builder application 108 listens for events on canvas 112. For example, platform 100 listens for events, such as hover, click, drag and drop, typing, etc., on user interface 104 that indicate actions to perform on canvas 112.

At 906, block builder application 108 determines if an interaction is received. If an interaction is not received, process reiterates to 904 to listen for events on canvas 112 again. If an interaction is received, at 908, block builder application 108 generates an update to canvas 112 based on the interaction. For example, if a drag and drop of an image occurs on canvas 112, platform 100 may display the image in canvas 112.

EXAMPLE

Figure 10:
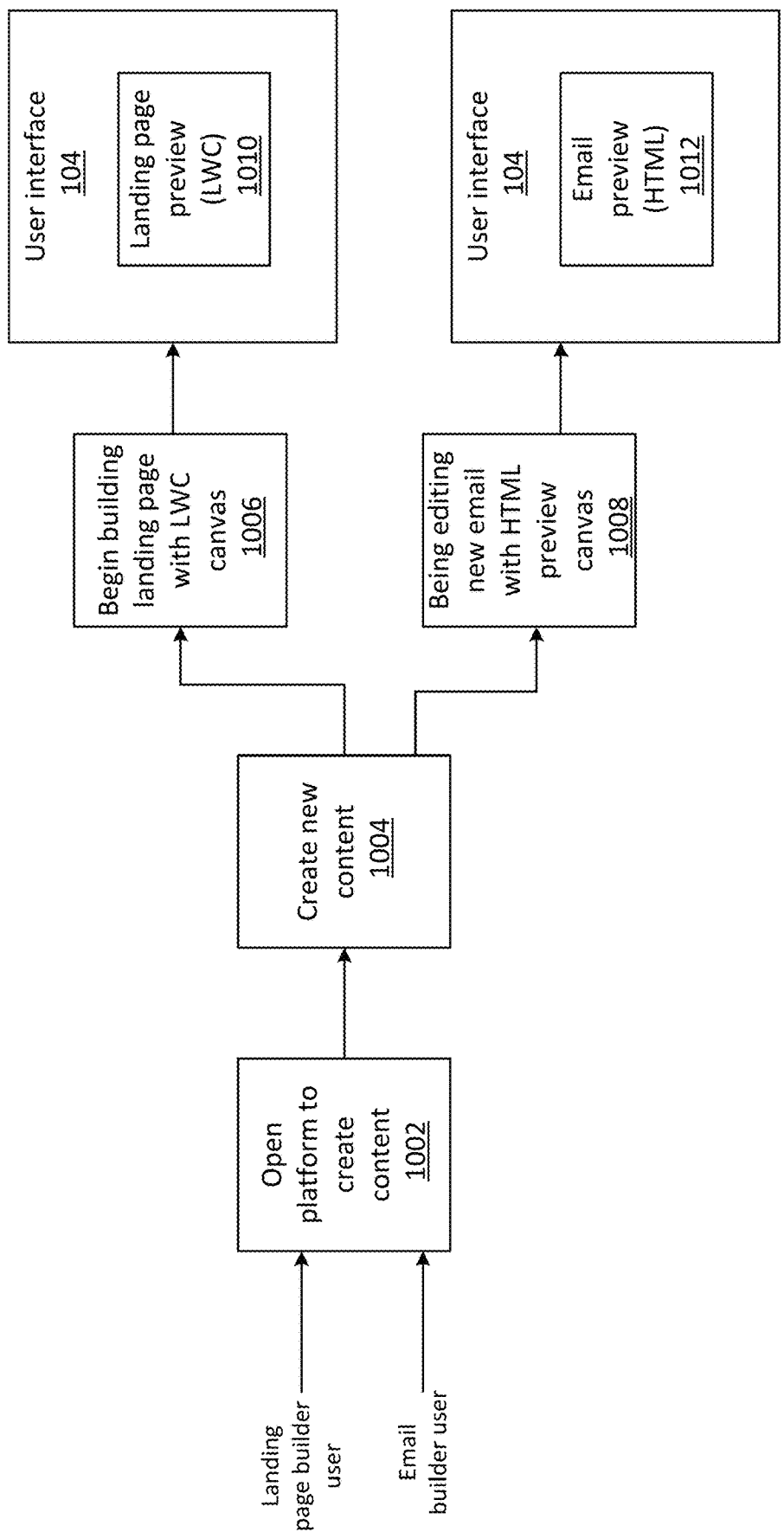
FIG. 10 depicts an example of using the platform when creating different content types according to some embodiments.

FIG. 10 depicts an example of using platform 100 when creating different content types according to some embodiments. A landing page builder user may want to build a landing page and an email builder user may want to build an email. At 1002, both users may open and use platform 100. The users can select a content type in which they would like to create. For example, a selection of a landing page type is received from the landing page builder and a selection of email is received from the email builder user. Block builder application 108 is launched for both content types. At 1004, both users create content using interactions to compose reusable fragments of content using elements, such as paragraphs, headings, HTML blocks, images, etc. For example, at 1006, the landing page builder builds a landing page using an LWC canvas. Also, at 1008, the email builder user builds an email using an HTML canvas. The canvases use different compilers to generate the respective content, which is shown at 1010 for the landing page and 1012 for the email.

CONCLUSION

Accordingly, platform 100 may offer different technologies that can be used to build content for different canvases. A user does not need to switch between different front-end technologies to build content using each specific technology. This improves an interface that is used to create content. The compilers that may be used may be aggregated using platform 100 and any external dependencies made available. This allows platform 100 to offer a single user interface, 104 to provide different canvases 112 from different technologies.

Figure 11:
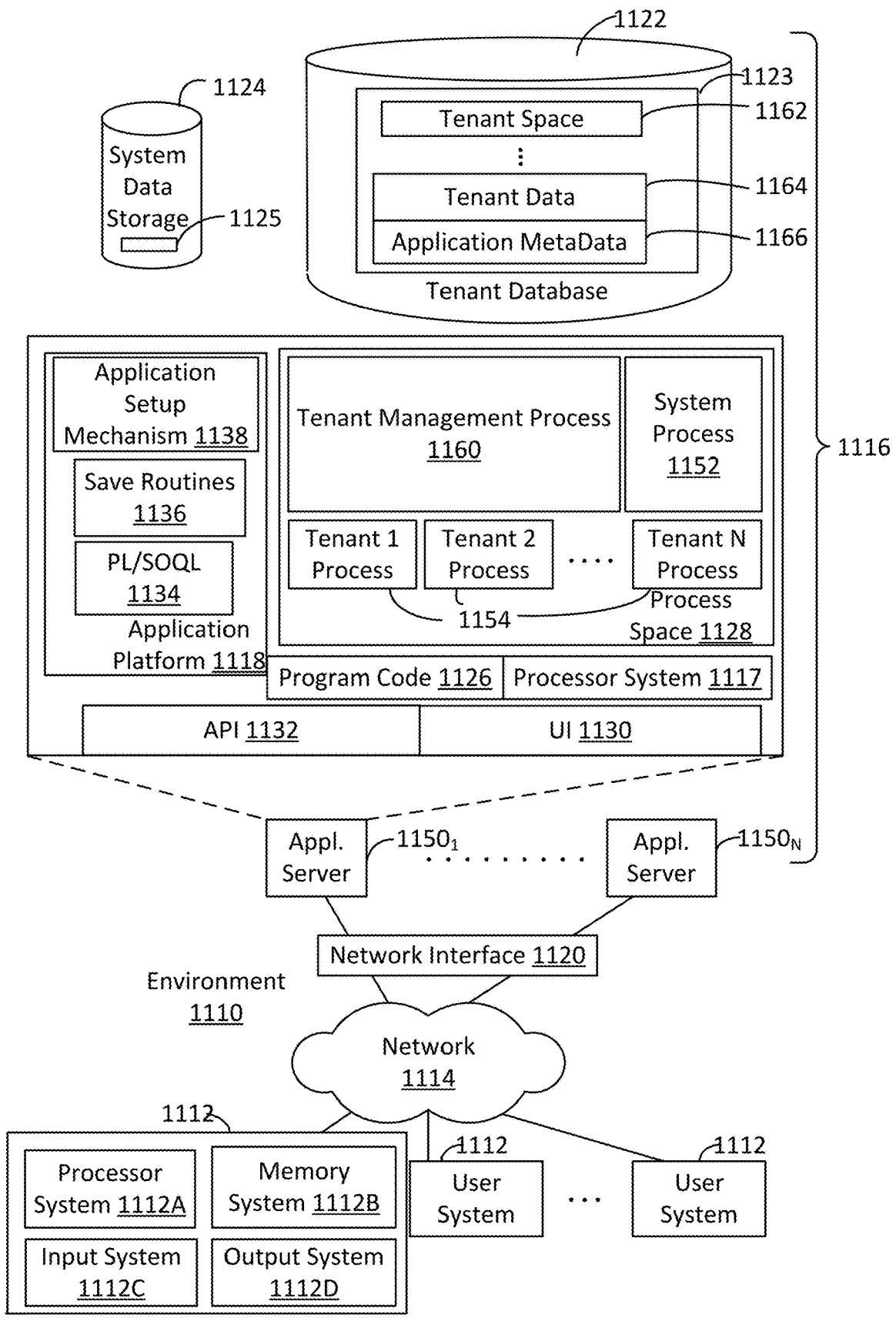
FIG. 11 shows a block diagram of an example of an environment that includes an on-demand database service configured in accordance with some implementations.

FIG. 11 shows a block diagram of an example of an environment 1110 that includes an on-demand database service configured in accordance with some implementations. Environment 1110 may include user systems 1112, network 1114, database system 1116, processor system 1117, application platform 1118, network interface 1120, tenant data storage 1122, tenant data 1123, system data storage 1124, system data 1125, program code 1126, process space 1128, User Interface (UI) 1130, Application Program Interface (API) 1132, PL/SOQL 1134, save routines 1136, application setup mechanism 1138, application servers 1150-1 through 1150-N, system process space 1152, tenant process spaces 1154, tenant management process space 1160, tenant storage space 1162, user storage 1164, and application metadata 1166. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1116, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1118 may be a framework that allows the creation, management, and execution of applications in system 1116. Such applications may be developed by the database service provider or by users or third-party application developers accessing the service. Application platform 1118 includes an application setup mechanism 1138 that supports application developers' creation and management of applications, which may be saved as metadata into tenant data storage 1122 by save routines 1136 for execution by subscribers as one or more tenant process spaces 1154 managed by tenant management process 1160 for example. Invocations to such applications may be coded using PL/SOQL 1134 that provides a programming language style interface extension to API 1132. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1166 for a subscriber making such an invocation. Such system processes may also manage execution of application metadata 1166 as an application in a virtual machine.

In some implementations, each application server 1150 may handle requests for any user associated with any organization. A load balancing function (e.g., an F5 Big-IP load balancer) may distribute requests to the application servers 1150 based on an algorithm such as least-connections, round robin, observed response time, etc. Each application server 1150 may be configured to communicate with tenant data storage 1122 and the tenant data 1123 therein, and system data storage 1124 and the system data 1125 therein to serve requests of user systems 1112. The tenant data 1123 may be divided into individual tenant storage spaces 1162, which can be either a physical arrangement and/or a logical arrangement of data. Within each tenant storage space 1162, user storage 1164 and application metadata 1166 may be similarly allocated for each user. For example, a copy of a user's most recently used (MRU) items might be stored to user storage 1164. Similarly, a copy of MRU items for an entire tenant organization may be stored to tenant storage space 1162. A UI 1130 provides a user interface and an API 1132 provides an application programming interface to system 1116 resident processes to users and/or developers at user systems 1112.

System 1116 may implement a web-based content system. For example, in some implementations, system 1116 may include application servers configured to implement and execute block builder software applications. The application servers may be configured to provide related data, code, forms, web pages and other information to and from user systems 1112. Additionally, the application servers may be configured to store information to, and retrieve information from a database system. Such information may include related data, objects, and/or Webpage content. With a multi-tenant system, data for multiple tenants may be stored in the same physical database object in tenant data storage 1122, however, tenant data may be arranged in the storage medium(s) of tenant data storage 1122 so that data of one tenant is kept logically separate from that of other tenants. In such a scheme, one tenant may not access another tenant's data, unless such data is expressly shared.

Several elements in the system shown in FIG. 11 include conventional, well-known elements that are explained only briefly here. For example, user system 1112 may include processor system 1112A, memory system 1112B, input system 1112C, and output system 1112D. A user system 1112 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1112 to access, process and view information, pages and applications available from system 1116 over network 1114. Network 1114 may be any network or combination of networks of devices that communicate with one another, such as any one or any combination of a LAN (local area network), WAN (wide area network), wireless network, or other appropriate configuration.

The users of user systems 1112 may differ in their respective capacities, and the capacity of a particular user system 1112 to access information may be determined at least in part by "permissions" of the particular user system 1112. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 1116. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1116 may provide on-demand database service to user systems 1112 using an MTS arrangement. By way of example, one tenant organization may be a company that employs a sales force where each salesperson uses system 1116 to manage their sales process. Thus, a user in such an organization may maintain contact data, leads data, customer follow-up data, performance data, goals and progress data, etc., all applicable to that user's personal sales process (e.g., in tenant data storage 1122). In this arrangement, a user may manage his or her sales efforts and cycles from a variety of devices, since relevant data and applications to interact with (e.g., access, view, modify, report, transmit, calculate, etc.) such data may be maintained and accessed by any user system 1112 having network access.

When implemented in an MTS arrangement, system 1116 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1116 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1116 may also maintain system-level data usable by multiple tenants or other data. Such system-level data may include industry reports, news, postings, and the like that are sharable between tenant organizations.

In some implementations, user systems 1112 may be client systems communicating with application servers 1150 to request and update system-level and tenant-level data from system 1116. By way of example, user systems 1112 may send one or more queries requesting data of a database maintained in tenant data storage 1122 and/or system data storage 1124. An application server 1150 of system 1116 may automatically generate one or more SQL statements (e.g., one or more SQL queries) that are designed to access the requested data. System data storage 1124 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 12A:
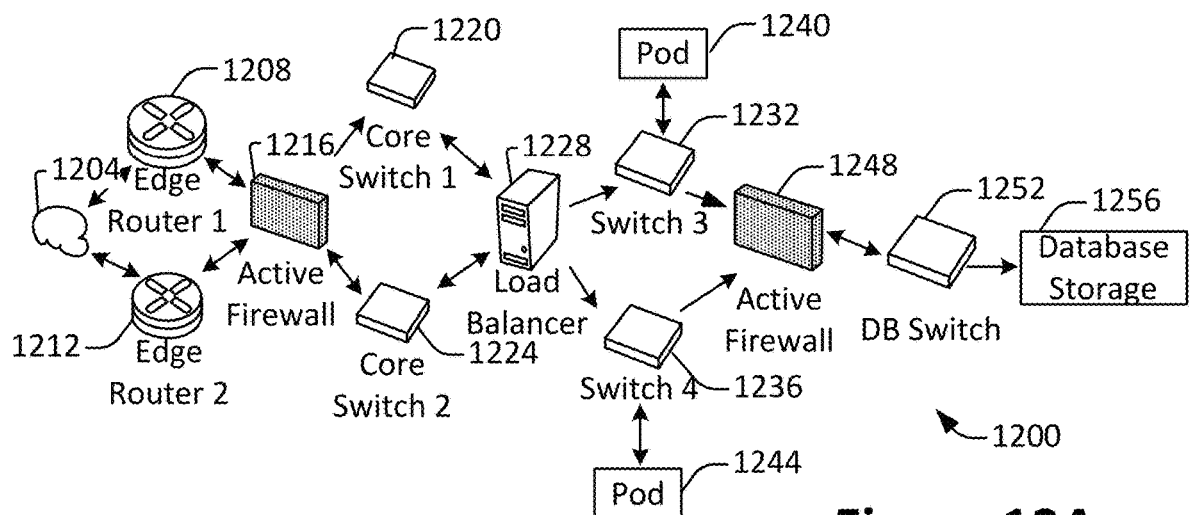
FIG. 12A shows a system diagram of an example of architectural components of an on-demand database service environment, configured in accordance with some implementations.

FIG. 12A shows a system diagram of an example of architectural components of an on-demand database service environment 1200, configured in accordance with some implementations. A client machine located in the cloud 1204 may communicate with the on-demand database service environment via one or more edge routers 1208 and 1212. A client machine may include any of the examples of user systems 1112 described above. The edge routers 1208 and 1212 may communicate with one or more core switches 1220 and 1224 via firewall 1216. The core switches may communicate with a load balancer 1228, which may distribute server load over different pods, such as the pods 1240 and 1244 by communication via pod switches 1232 and 1236. The pods 1240 and 1244, which may each include one or more servers and/or other computing resources, may perform data processing and other operations used to provide on-demand services. Components of the environment may communicate with a database storage 1256 via a database firewall 1248 and a database switch 1252.

Accessing an on-demand database service environment may involve communications transmitted among a variety of different components. The environment 1200 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 12A and 12B.

The cloud 1204 refers to any suitable data network or combination of data networks, which may include the Internet. Client machines located in the cloud 1204 may communicate with the on-demand database service environment 1200 to access services provided by the on-demand database service environment 1200. By way of example, client machines may access the on-demand database service environment 1200 to retrieve, store, edit, and/or process content information.

In some implementations, the edge routers 1208 and 1212 route packets between the cloud 1204 and other components of the on-demand database service environment 1200. The edge routers 1208 and 1212 may employ the Border Gateway Protocol (BGP). The edge routers 1208 and 1212 may maintain a table of IP networks or 'prefixes', which designate network reachability among autonomous systems on the internet.

In one or more implementations, the firewall 1216 may protect the inner components of the environment 1200 from internet traffic. The firewall 1216 may block, permit, or deny access to the inner components of the on-demand database service environment 1200 based upon a set of rules and/or other criteria. The firewall 1216 may act as one or more of a packet filter, an application gateway, a stateful filter, a proxy server, or any other type of firewall.

In some implementations, the core switches 1220 and 1224 may be high-capacity switches that transfer packets within the environment 1200. The core switches 1220 and 1224 may be configured as network bridges that quickly route data between different components within the on-demand database service environment. The use of two or more core switches 1220 and 1224 may provide redundancy and/or reduced latency.

In some implementations, communication between the pods 1240 and 1244 may be conducted via the pod switches 1232 and 1236. The pod switches 1232 and 1236 may facilitate communication between the pods 1240 and 1244 and client machines, for example via core switches 1220 and 1224. Also or alternatively, the pod switches 1232 and 1236 may facilitate communication between the pods 1240 and 1244 and the database storage 1256. The load balancer 1228 may distribute workload between the pods, which may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248, which may act as a computer application firewall operating at the database application layer of a protocol stack. The database firewall 1248 may protect the database storage 1256 from application attacks such as structure query language (SQL) injection, database rootkits, and unauthorized information disclosure. The database firewall 1248 may include a host using one or more forms of reverse proxy services to proxy traffic before passing it to a gateway router and/or may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, the database storage 1256 may be an on-demand database system shared by many different organizations. The on-demand database service may employ a single-tenant approach, a multi-tenant approach, a virtualized approach, or any other type of database approach. Communication with the database storage 1256 may be conducted via the database switch 1252. The database storage 1256 may include various software components for handling database queries. Accordingly, the database switch 1252 may direct database queries transmitted by other components of the environment (e.g., the pods 1240 and 1244) to the correct components within the database storage 1256.

Figure 12B:
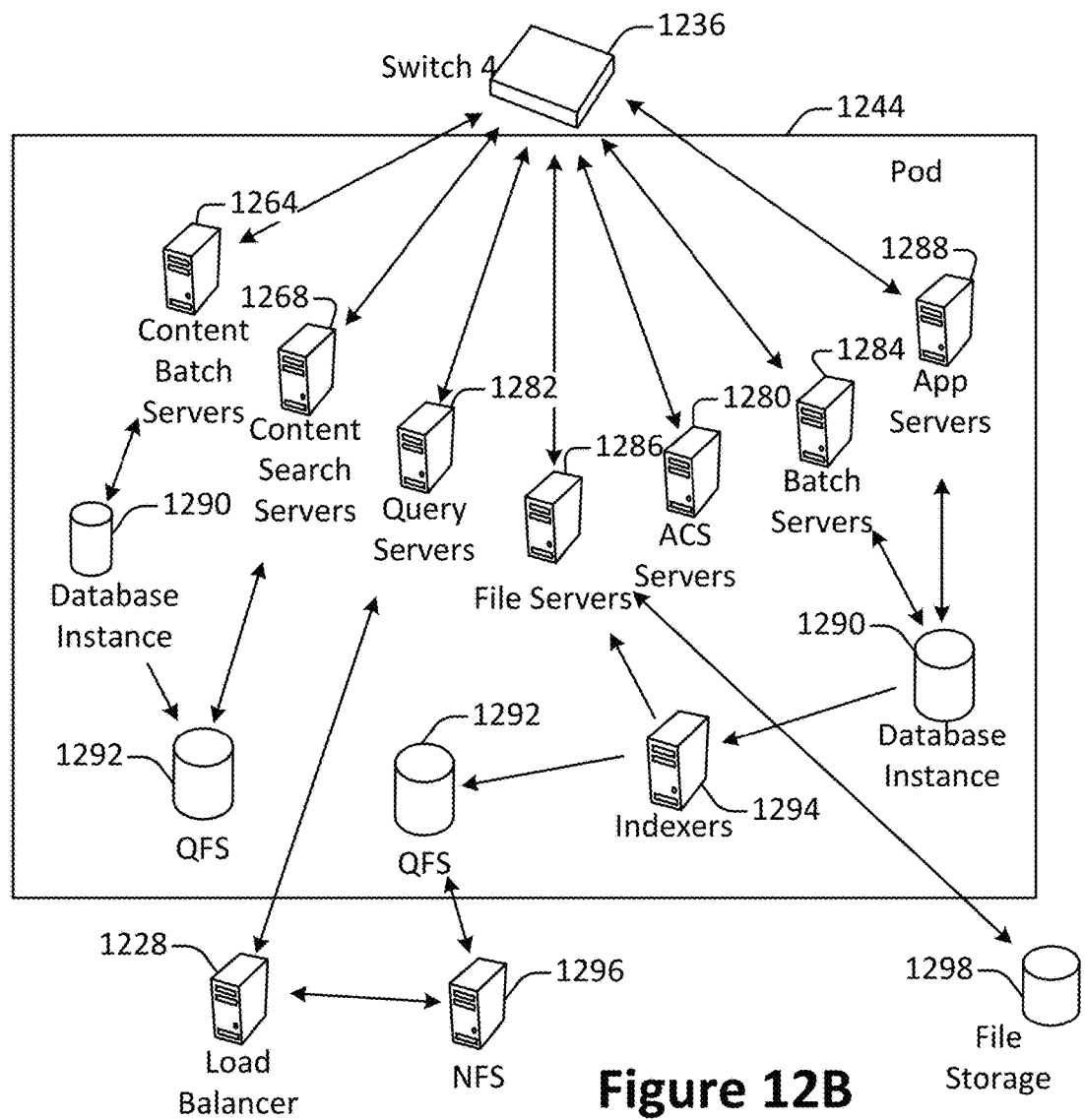
FIG. 12B shows a system diagram further illustrating an example of architectural components of an on-demand database service environment, in accordance with some implementations.

FIG. 12B shows a system diagram further illustrating an example of architectural components of an on-demand database service environment, in accordance with some implementations. The pod 1244 may be used to render services to user(s) of the on-demand database service environment 1200. The pod 1244 may include one or more content batch servers 1264, content search servers 1268, query servers 1282, file servers 1286, access control system (ACS) servers 1280, batch servers 1284, and app servers 1288. Also, the pod 1244 may include database instances 1290, quick file systems (QFS) 1292, and indexers 1294. Some or all communication between the servers in the pod 1244 may be transmitted via the switch 1236.

In some implementations, the app servers 1288 may include a framework dedicated to the execution of procedures (e.g., programs, routines, scripts) for supporting the construction of applications provided by the on-demand database service environment 1200 via the pod 1244. One or more instances of the app server 1288 may be configured to execute all or a portion of the operations of the services described herein.

In some implementations, as discussed above, the pod 1244 may include one or more database instances 1290. A database instance 1290 may be configured as an MTS in which different organizations share access to the same database, using the techniques described above. Database information may be transmitted to the indexer 1294, which may provide an index of information available in the database 1290 to file servers 1286. The QFS 1292 or other suitable filesystem may serve as a rapid-access file system for storing and accessing information available within the pod 1244. The QFS 1292 may support volume management capabilities, allowing many disks to be grouped together into a file system. The QFS 1292 may communicate with the database instances 1290, content search servers 1268 and/or indexers 1294 to identify, retrieve, move, and/or update data stored in the network file systems (NFS) 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information over a network in a manner similar to how local storage is accessed. Queries from the query servers 1222 may be transmitted to the NFS 1296 via the load balancer 1228, which may distribute resource requests over various resources available in the on-demand database service environment 1200. The NFS 1296 may also communicate with the QFS 1292 to update the information stored on the NFS 1296 and/or to provide information to the QFS 1292 for use by servers located within the pod 1244.

In some implementations, the content batch servers 1264 may handle requests internal to the pod 1244. These requests may be long-running and/or not tied to a particular customer, such as requests related to log mining, cleanup work, and maintenance tasks. The content search servers 1268 may provide query and indexer functions such as functions allowing users to search through content stored in the on-demand database service environment 1200. The file servers 1286 may manage requests for information stored in the file storage 1298, which may store information such as documents, images, basic large objects (BLOBs), etc. The query servers 1282 may be used to retrieve information from one or more file systems. For example, the query system 1282 may receive requests for information from the app servers 1288 and then transmit information queries to the NFS 1296 located outside the pod 1244. The ACS servers 1280 may control access to data, hardware resources, or software resources called upon to render services provided by the pod 1244. The batch servers 1284 may process batch jobs, which are used to run tasks at specified times. Thus, the batch servers 1284 may transmit instructions to other servers, such as the app servers 1288, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 13:
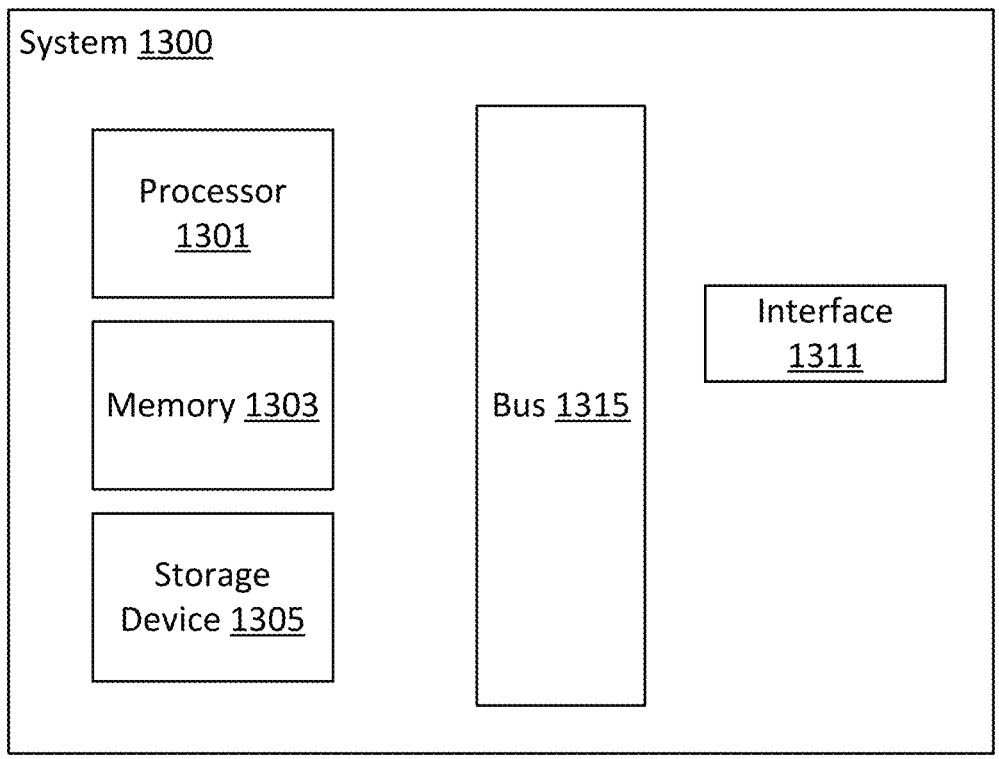
FIG. 13 illustrates one example of a computing device.

FIG. 13 illustrates one example of a computing device. According to various embodiments, a system 1300 suitable for implementing embodiments described herein includes a processor 1301, a memory module 1303, a storage device 1305, an interface 1311, and a bus 1315 (e.g., a PCI bus or other interconnection fabric.) System 1300 may operate as variety of devices such as an application server, a database server, or any other device or service described herein. Although a particular configuration is described, a variety of alternative configurations are possible. The processor 1301 may perform operations such as those described herein. Instructions for performing such operations may be embodied in the memory 1303, on one or more non-transitory computer readable media, or on some other storage device. Various specially configured devices can also be used in place of or in addition to the processor 1301. The interface 1311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving, by a computing device, a definition that associates a compiler with a content type, wherein the definition defines blocks that can be included in the content type;
receiving, by the computing device, an input to create the content type on a platform;
selecting, by the computing device, the compiler from a plurality of compilers based on the compiler being associated with the content type in the definition, wherein compilers in the plurality of compilers use different technologies to generate content, and wherein the platform allows the plurality of compilers to be used;
receiving, by the computing device, a model for creating content for the content type;
processing, by the computing device, the model using the compiler to create output for blocks in the model; and
rendering, by the computing device, the output for the blocks to display the content on a user interface.

2. The method of claim 1, further comprising:
receiving a plurality of definitions for a plurality of content types, wherein a definition associates a respective compiler with a content type in the plurality of content types.

3. The method of claim 2, wherein:
a first compiler is associated with a first content type in the plurality of content types, and
a second compiler is associated with a second content type in the plurality of content types.

4. The method of claim 1, wherein selecting the compiler from the plurality of compilers comprises:
retrieving a compiler component for the content type that defines the compiler for the content type, wherein the compiler component was generated based on receiving a definition that associates the compiler with the content type.

5. The method of claim 1, wherein selecting the compiler from the plurality of compilers comprises:
retrieving the compiler from storage that is storing compilers from the plurality of compilers.

6. The method of claim 1, further comprising:
upon selecting the compiler, loading a module that is used by the compiler, wherein the module is downloaded from an external source.

7. The method of claim 1, wherein receiving the model comprises:
receiving input defining the blocks of the model, wherein the blocks define a template; and
generating the model using the input.

8. The method of claim 1, further comprising:
receiving a current version of the model;
comparing the current version of the model to a previous version of the model; and
generating a patch that defines a change to the previous version of the model.

9. The method of claim 8, further comprising:
processing the patch to alter an output for a block that is rendered in the user interface.

10. The method of claim 1, further comprising:
allowing interactions to create the output for the blocks on the user interface.

11. The method of claim 10, further comprising:
marking a block of the model in the user interface to allow a defined interaction to be received for the respective block.

12. The method of claim 1, further comprising:
receiving an interaction on an output for a block in the user interface; and
performing an action to apply the interaction to the block.

13. The method of claim 1, wherein compilers in the plurality of compilers are associated with different content building technologies.

14. The method of claim 1, further comprising:
storing the output for the blocks as a content template; and
allowing the content template to be used to create a piece of content, wherein content is inserted into the content template to create the piece of content.

15. The method of claim 14, further comprising:
receiving input for inserting information in the content template; and
inserting the information in the content template in the user interface.

16. The method of claim 15, wherein receiving the input comprises:
receiving an interaction on the user interface to insert the information in a block; and
communicating with the block to display the information.

17. A computer program product comprising computer-readable program code capable of being executed by one or more processors when retrieved from a non-transitory computer-readable medium, the program code comprising instructions configurable to cause:
receiving a definition that associates a compiler with a content type, wherein the definition defines blocks that can be included in the content type;
receiving an input to create the content type on a platform;
selecting the compiler from a plurality of compilers based on the compiler being associated with the content type in the definition, wherein compilers in the plurality of compilers use different technologies to generate content, and wherein the platform allows the plurality of compilers to be used;
receiving a model for creating content for the content type;
processing the model using the compiler to create output for blocks in the model; and
rendering the output for the blocks to display the content on a user interface.

18. The computer program product of claim 17, wherein selecting the compiler from the plurality of compilers comprises:
retrieving a compiler component for the content type that defines the compiler for the content type, wherein the compiler component was generated based on receiving a definition that associates the compiler with the content type.

19. The computer program product of claim 17, wherein receiving the model comprises:
receiving input defining blocks of the model, wherein the blocks define a template; and
generating the model using the input.

20. An apparatus comprising:
one or more computer processors; and
a computer program product comprising computer-readable program code capable of being executed by one or more processors when retrieved from a non-transitory computer-readable medium, the program code comprising instructions configurable to cause:
receiving a definition that associates a compiler with a content type, wherein the definition defines blocks that can be included in the content type;
receiving an input to create the content type on a platform;
selecting the compiler from a plurality of compilers based on the compiler being associated with the content type in the definition, wherein compilers in the plurality of compilers use different technologies to generate content, and wherein the platform allows the plurality of compilers to be used;
receiving a model for creating content for the content type;
processing the model using the compiler to create output for blocks in the model; and
rendering the output for the blocks to display the content on a user interface.

* * * * *